Aug. 12, 1941.　　　　P. B. DRANE　　　　2,251,924
HATCH CONTROLLED VALVE FOR STORAGE TANKS
Filed March 22, 1939　　　3 Sheets-Sheet 1

Phillips B. Drane
INVENTOR

ATTORNEY

Aug. 12, 1941.   P. B. DRANE   2,251,924
HATCH CONTROLLED VALVE FOR STORAGE TANKS
Filed March 22, 1939   3 Sheets-Sheet 2

Phillips B. Drane
INVENTOR
BY
ATTORNEY

Phillips B. Drane
INVENTOR

Patented Aug. 12, 1941

2,251,924

UNITED STATES PATENT OFFICE 2,251,924

HATCH CONTROLLED VALVE FOR STORAGE TANKS

Phillips B. Drane, Tulsa, Okla.

Application March 22, 1939, Serial No. 263,553

12 Claims. (Cl. 220—85)

The invention relates to hatch controlled by-pass and outlet valves carried by a tank, and has for its object to provide manually operated lever means adjacent the hatch whereby the outlet valve may be opened and the by-pass valve closed preparatory to a hatch opening operation, thereby allowing the gas pressure to be relieved through the outlet valve and back pressure in the by-pass pipe into the tank prevented, so that when the hatch is opened for a thieving operation there will not be a blast of gas into the operator's face.

A further object is to provide means whereby the by-pass valve will be opened and the outlet valve closed when the hatch cover is slammed to closed position.

A further object is to control the valves by a rock lever, rockably mounted between the valves within the tank and rocked by the operating lever carried by the hatch ring.

A further object is to provide a link connection between the rock lever and a crank carried by the operating shaft.

A further object is to hingedly mount the operating lever on the shaft so it will have limited side movement in the plane of the shaft against the action of an expansion spring, whereby upon manual movement of the lever, said lever can be swung outwardly to clear the restoring lug carried by the hatch cover, and when released will assume a position in the path of the restoring lug so that when the cover is slammed to closed position the operating lever will be engaged by the lug and returned to normal position with the by-pass valve open and the outlet valve closed.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 1:
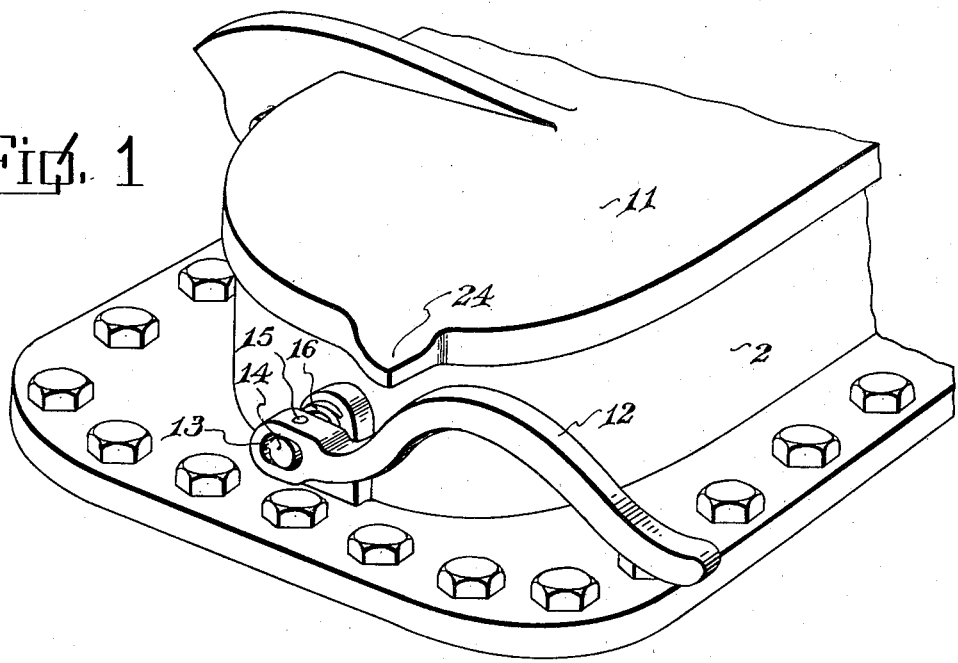
Figure 1 is a perspective view of one side of a storage tank hatch, showing the operating lever in closed position.

Referring to the drawings, the numeral 1 designates the tank top, and 2 the hatch case carried by the tank top, and through which access may be had to the tank for thieving purposes. It is to be understood that a series of tanks may be connected and the pressure or gas from one tank to the other by-passed through the by-pass pipe 3 carried by the valve casing 4, and in which casing is disposed a valve 5, which cooperates with the valve seat 6.

Disposed adjacent the valve casing 4 is a valve casing 7 having an outlet valve 8 therein and gas and pressure passes to the stack exhaust through the pipe 9. The valve 8 is preferably weighted and cooperates with a valve seat 10. Under normal conditions, when the hatch cover 11 is closed, the by-pass valve 5 is held open so gas will pass through the by-pass pipe 3 to other tanks. At the same time the weighted valve 8 is closed and is unseated from time to time by excess pressure within the tank.

Figure 2:
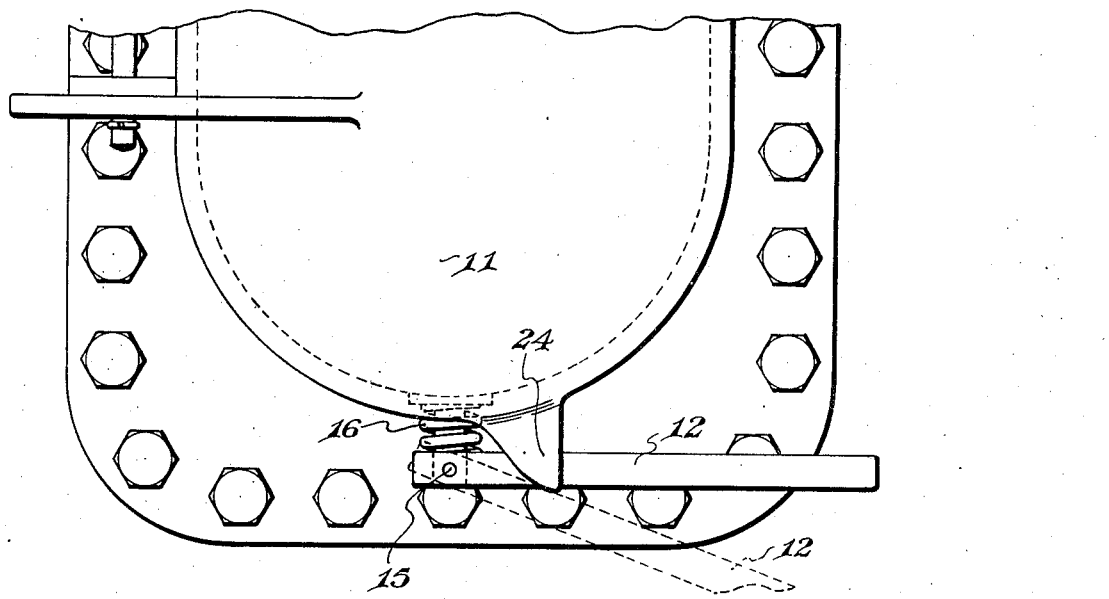
Figure 2 is a top plan view of one side of the hatch, showing in dotted lines the position the operating lever assumes for clearing the restoring lug.

The hatches are opened from time to time for thieving operations and there is a rush of gas through the hatch into the face of the operator. To obviate this difficulty means is provided whereby the valve 8 may be initially opened before the opening of the hatch for allowing exhaust of excess gases, and at the same time the valve 5 is closed to cut off back pressure from other connected tanks. To accomplish this result a manually operated lever 12 is provided on the hatch casing 2, and to one side thereof. The lever 12 is provided with an elongated aperture 13 therein, and through which aperture the operating shaft 14 extends and is hingedly connected to the lever by transverse pin 15. It will be seen that the lever 12 may hingedly move outwardly in the plane of the shaft against the action of the expansion spring 16, the purpose of which will presently appear said outward position is shown in dotted lines in Figure 2. It will also be seen that when the lever is released the expansion spring 16 will force the lever to a right angle position as shown in dotted lines in Figure 11. Shaft 14 extends into the hatch casing and is provided with a crank arm 17. Pivotally connected at 18 is an arcuately shaped link 19, to the end of which is pivotally connected at 20 one end of the rock lever 21, and which lever is rockably mounted at 22 between and beneath the valves 5 and 8.

Figure 3:
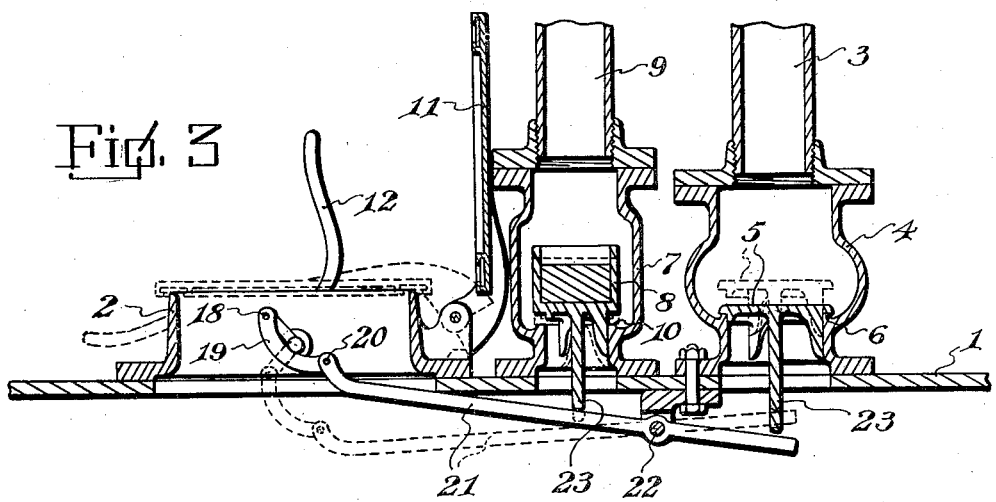
Figure 3 is a vertical transverse sectional view through the hatch and the valves, showing the hatch cover open and the operating lever in operated position for opening the outlet valve and closing the by-pass valve.

The valves 5 and 8 are provided with downwardly extending members 23 in the path of the arms of the lever 21, and it will be seen, by referring to Figure 3, when the lever 12 is moved upwardly the valve 8 will be unseated and valve 5 allowed to seat, thereby allowing exhaust of pressure through the pipe 9 and preventing entrance of back pressure through the pipe 3. By providing the arcuate link 19 there is an over center throw which will obviate the possibility of the lever 12 swinging to closed position.

Figure 8:
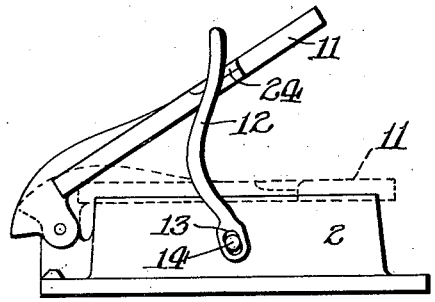
Figure 8 is a view, similar to Figure 7, showing the cover partially open and the restoring lug passing the operating handle.
Figure 9:
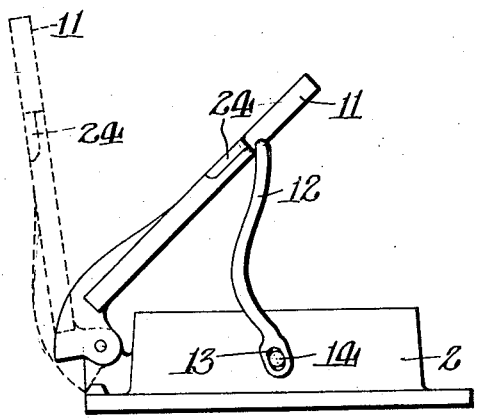
Figure 9 is a view similar to Figure 7 showing the cover open and the lug behind the handle and in the path of the handle, whereby it will engage the handle when the cover is closed.

Extending outwardly from one side of the cover 11 is a restoring lug 24 which cams pass the lever 12 when the lever is in raised position, clearly shown in Figures 8 and 9. When the cover is raised the lug 24 engages the forward side of the lever and tilts said lever outwardly against the action of the spring 16 as clearly shown in Figure 11. After the lug clears the lever 12 the expansive action of the spring 16 will cause the lever to assume a right angle position in relation to the shaft 14 and a position in advance of the lug 24 as shown in Figure 9. After the thieving operation the operator slams the cover 11 to closed position and in so doing the restoring lug 24 engages the rear side of the operating lever 12 and forces said lever to lowered position as shown in Figure 1, hence it will be seen that danger of leaving the valves in reverse relation is obviated. The full line position of the parts shown in Figure 3 shows the hatch cover open, the bypass valve closed and the pressure relief valve open, while the dotted line position shows the hatch cover closed, the pressure valve closed and the by-pass valve 5 open.

Figure 4:
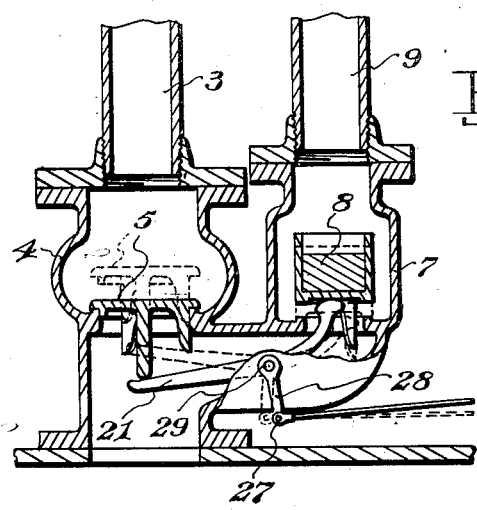
Figure 4 is a sectional view through the valves and showing operating means for controlling the valves from a hatch remote in relation to the valves.
Figure 5:
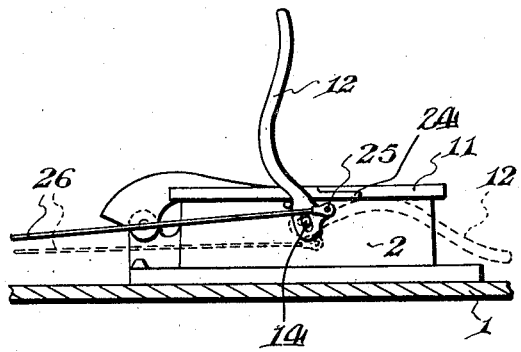
Figure 5 is a detail perspective view of a portion of the operating lever shown in Figure 4.
Figure 5:
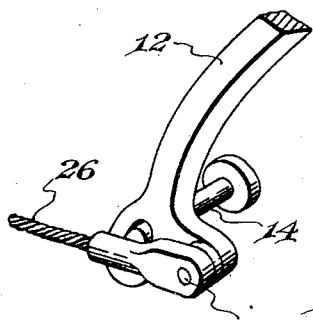
Figure 6:
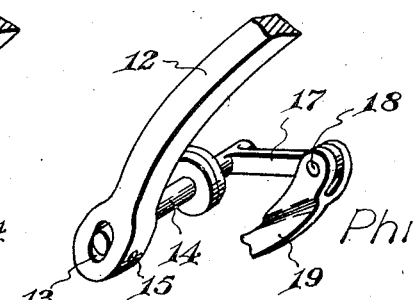
Figure 6 is a detail perspective view of a portion of the operating lever and operating shaft shown in Figure 3.

Referring to Figures 4 and 5 wherein a modified form is shown, the valves are located in a remote relation to the hatch, however the same numerals apply to the valve structure. In this form the lever 12 has connected thereto at 25 a cable or rod 26, which cable or rod is in turn connected at 27 to a crank arm 28 carried by a rock shaft 29, and on which rock shaft is mounted the rock lever, which operates in the same manner as in Figure 3.

Referring to Figure 4, it will be seen that the connecting point 25 of the cable or rod 26 to the lever 12 will pass the center of the operating shaft 14 when the lever 12 is moved to the dotted line position by the closing of the cover 11, and in the case of a cable, allowing the weighted valve 8 to close by gravity and lifting the lighter valve 5, otherwise the operation is the same as set forth in connection with the form shown in Figure 3. In Figure 4 the dotted line position of the parts shows the bypass valve open and the pressure relief valve closed and a lever 12 in lower position after being forced downwardly by the lug 24 of the cover 11.

Figure 7:
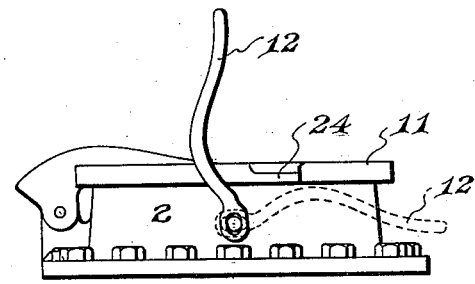
Figure 7 is a side elevation of the hatch, showing the lever in operated position.
Figure 10:
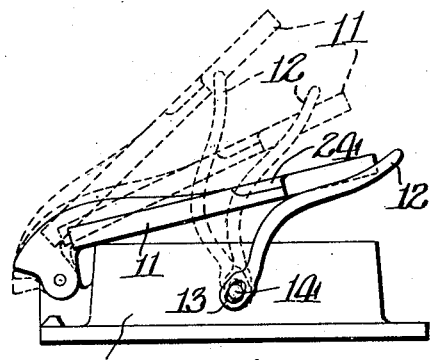
Figure 10 is a view similar to Figure 7 but showing the cover in various positions when being closed for returning the handle to inoperative horizontal position.
Figure 11:
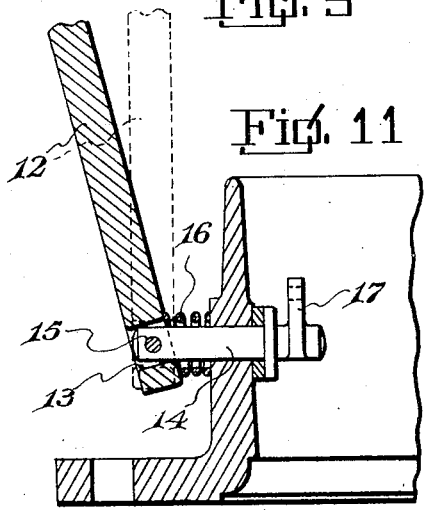
Figure 11 is a detail sectional view through one side of the hatch ring and a portion of the lever but showing the lever swung outwardly against the action of the expansion spring for clearing the lug.

Figure 7 shows in dotted lines the normal position of the lever 12 and in full lines the upper position of said lever, so that said lever will be in the path of the lug 24 when the closure 11 is moved from the dotted line position shown in Figure 8 to the dotted line position shown in Figure 9. In Figure 10 is shown in dotted lines the position of the closure 11 and the lever 12 as the closure is moved to closed position. Referring to Figure 11 the side pivotal movement of the lever 12 is shown in dotted and full lines.

From the above it will be seen that a hatch cover control for the outlet and by-pass valves of tanks is provided, which is constructed in a manner whereby the operator may control the valves for allowing the outlet of gas from the tank and preventing back pressure in the tank before the hatch cover is opened, and after a brief lapse of time he can safely open the cover and avoid the blast of gas through the hatch. It will also be seen that when the cover is closed, the cover will engage the lever and return the same to initial inoperative position, restoring the valves to their normal positions with the by-pass valve positively maintained open and the outlet valve seated for operation under pressure in the usual manner.

The invention having been set forth what is claimed as new and useful is:

1. The combination with a tank having a pressure outlet valve carried by said tank, a hatch closure carried by said tank, a by-pass valve carried by said tank, of lever control means cooperating with said valves from the outside of the tank for alternately seating and unseating said valves and means carried by the closure for operating said lever control means.

2. The combination with a pressure tank having an outlet valve and a by-pass valve, a hatch, a closure for said hatch, of lever means adjacent the hatch and controlled by said closure for alternately opening and closing said valves, said lever control means extending through the hatch and into the tank and cooperating with a second lever means controlling the valves from within the tank.

3. A device as set forth in claim 2 including a hinged mounting for said closure, and means carried by the cover and cooperating with the lever means for moving the same to closed position upon the closing of the cover.

4. The combination with a tank having a hatch, a hinged cover carried by the hatch, outlet and by-pass valves for said tank adjacent said hatch, of means for alternately opening and closing said valves, said means comprising a lever carried by the hatch, a rock lever within the tank and rockably mounted at a point between the valves whereby the valves will be alternately seated and unseated upon rocking of the lever, one end of said rock lever terminating adjacent the hatch, crank means carried by the lever within the hatch and connected to the rock lever for rocking the rock lever upon movement of the handle, said lever being positioned in the path of a portion of the cover and adapted to be moved by the cover upon closing of the cover to reverse the valves.

5. A device as set forth in claim 4 including means carried by the cover whereby when the lever is in raised position and the cover opened said means will cam past the lever and when said cover is moved to closed position said cover means will engage the lever and return the same to lowered inoperative position.

6. A device as set forth in claim 4 wherein the outlet valve is weighted and disposed between the pivotal point of the rock lever and the hatch.

7. A device as set forth in claim 4 wherein the lever carried by the hatch is in the path of a lug carried by the cover of the hatch and the lever is yieldably mounted whereby upon opening of the cover the lug will cam past the lever and the lever will spring into the path of the lug whereby upon closing of the cover said lever will be returned from vertical operated position to initial horizontal position, for reversing the valves.

8. The combination with a pressure tank having a hatch provided with a hinged cover, a pressure outlet valve adjacent the hatch, a by-pass valve adjacent the hatch, means within the tank for alternately seating and unseating said valves, a manually operated lever controlling said last named means through the hatch opening and means carried by the cover in the path of the lever when the cover is opened for engaging the lever and returning the same to inoperative position upon the closing of the cover.

9. The combination with a pressure tank having a hatch, said hatch including a hinged cover outlet and by-pass valves carried by the tank remote in relation to the hatch, said valves being disposed in a valve casing above the tank, a rock lever within the valve casing for alternately seating and unseating said valves when the hatch cover is opened and then closed, a manually operated lever adjacent the hatch for alternately opening and closing the valves, a lug carried by the cover in the path of the manually operated lever, said lever being yieldably maintained in the plane and path of movement of the lug upon opening of the cover and against yieldable movement upon closing of the cover, a member pivoted to the operating lever, said member extending towards the valve casing and a crank arm carried by the rock lever within the valve casing and to which said last named member is connected.

10. A device as set forth in claim 9 wherein the member connected to the manually operated lever and extending towards the valve casing is connected to the manually operated lever at a point whereby its connection will pass beyond the center of the pivotal point of the lever upon the extreme movements of the lever to open or closed positions.

11. A device as set forth in claim 9 wherein the outlet valve is weighted and disposed between the by-pass valve and the hatch.

12. A device as set forth in claim 9 wherein the member pivoted to the operating lever comprises a cable.

PHILLIPS B. DRANE.